United States Patent [19]

Corte et al.

[11] 3,716,482

[45] Feb. 13, 1973

[54] ANION EXCHANGER WITH SPONGE STRUCTURE AND PROCESS OF USING SAME

[75] Inventors: Herbert corte, Leverkusen; Alfred Myers, Cologne-Stammheim, both of Germany

[73] Assignee: Bayer Aktiengesellschaft

[22] Filed: Sept. 14, 1970

[21] Appl. No.: 72,198

Related U.S. Application Data

[62] Division of Ser. No. 718,989, March 4, 1958, Pat. No. 3,637,535.

[30] Foreign Application Priority Data

March 9, 1957 Germany..............................2253239

[52] U.S. Cl....................................................210/37
[51] Int. Cl..................................................C02c 1/60
[58] Field of Search...................210/24, 37; 260/211

[56] References Cited

UNITED STATES PATENTS

| | | | |
|---|---|---|---|
| 2,591,574 | 4/1952 | McBurney | 260/2.1 |
| 3,147,214 | 9/1964 | Kressman et al. | 210/24 |
| 2,663,702 | 12/1953 | Kropa | 210/37 X |

Primary Examiner—Reuben Friedman
Assistant Examiner—Thomas G. Wyse
Attorney—Arthur G. Connolly et al.

[57] ABSTRACT

Organic impurities and inorganic anions are removed from an aqueous liquid by treating the liquid with a particulate anion exchange resin containing strongly basic groups and having a mean pore diameter of at least 100 Angstrom units.

8 Claims, No Drawings

ANION EXCHANGER WITH SPONGE STRUCTURE AND PROCESS OF USING SAME

This invention relates to anion-exchange resins and more particularly to a process of producing nitrogeneous anion-exchange resins with sponge structure, and is a division of Ser. No. 718,989, filed Mar, 4, 1958, now U.S. Pat. No. 3,637,535.

According to known processes, anion exchangers are produced from cross-linked polystyrene by halogenoalkylation and subsequent amination. Such processes are for instance disclosed in U.S. Pat. Nos. 2,591,573, 2,591,574, 2,614,099, 2,616,877, 2,629,710, 2,631,999, 2,632,000, 2,642,417, 2,725,361, and 2,794,785. The anion exchangers obtained by these processes, usually from bead polymers, are transparent gels which are slightly yellowish in color and which have proved entirely satisfactory for many purposes.

Such anion exchangers are capable of absorbing even acids of relatively high molecular weight, such as for example humic acids, but the absorption of such acids only takes place very slowly, so that with normal specific loads of 10 and higher, a large part of these acids is not combined. In addition, the regeneration of anion exchangers charged with such acids present difficulties because these acids can only be removed again from the anion exchangers very slowly and incompletely, for example with dilute caustic soda solution. In this way, these acids become concentrated in the anion exchanger and in addition to causing a reduction in capacity, they also result in a decrease in the exchange velocity with respect to small anions, such as for example $Cl^-$ or $SO_4^{--}$. Moreover, with anion exchangers contaminated in this manner, the washing water requirements are simultaneously increased, since the acids remaining in the exchanger impart an amphoteric character to the anion exchanger. Attempts have been made to obviate this defect of the anion exchangers by a lower degree of cross-linking of the polystyrene. However, there are limits to this procedure, since the strength of the exchanger is always decreased as the cross-linking is reduced and if cross-linking is reduced too far jellies are obtained which can no longer be used as exchangers on a technical scale by reason of their lack of strength and in addition exchangers do not show the required effect when the cross-linking is very low.

It has now been found that anion exchangers which do not have the defects referred to above and simultaneously show a high exchange velocity are obtained if the polymers used for the haloalkylation and subsequent amination are those which are obtained by polymerization of aromatic vinyl compounds with a cross-linking agent, such as for example divinyl benzene, in the presence of at least 20 percent (based on the weight of the monomers) of solvents which will dissolve the monomers but are not able to dissolve linear aromatic vinyl polymers such as polystyrene. Such organic liquids, which are hereinafter referred to as "non-solvents," are for example aliphatic hydrocarbons, alcohols, ethers, and nitro-compounds.

The polymers obtained in the presence of at least 20 percent but preferably at least 40 percent of these organic liquids are opaque and, depending on the amount of non-solvents used, are glossy to dull. The upper limit of the amount of non-solvents as based on the weight of the monomers is preferably 200 to 300 percent and depends on the amount of cross-linking agents applied in the polymerization mixture. These polymers have a sponge structure, i.e. they are permeated by small veins, into which non-solvents and non-swelling agents are also able to penetrate. Whereas the normal gel-like polymers are not able to absorb the non-solvents and therefore do not swell therein, the sponge-like polymers also absorb these organic liquids and even show a swelling because of their sponge structure.

The polymers thus obtained can either be subjected together with the non-solvent to the haloalkylation and subsequent amination, or the non-solvent is initially removed and only then is the haloalkylation carried out. In both cases, anion exchangers are formed which are of high genuine porosity, which can be recognized externally from the fact that the moist exchangers appear opaque or completely non-transparent.

All aromatic vinyl compounds, such as for example styrene, methyl styrene, vinyl anisole, vinyl naphthalene, as well as mixtures thereof can be used for the production of the anion exchangers according to the invention. Polyethylenically unsaturated compounds (that is to say compounds containing at least two vinylidene ($CH_2=C$) or ethylene

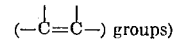
$(-\overset{|}{C}=\overset{|}{C}-)$ groups)

such as for example divinyl benzene, trivinyl benzene, ethylene glycol dimethacrylate, ethylene glycol diacrylate, diallylmaleate, divinylether, polymerizable esterification products of dihydric alcohols, such as glycol, diethyleneglycol, butanediol, and α-β-ethylenically unsaturated acids such as maleic, fumaric acids, such as glycol dimaleate and divinyl ketone can be considered as cross-linking agents. The amounts of cross-linking agents to be used can fluctuate within wide limits, but generally between about 0.5 to 50 percent by weight as based on the total amount of monomers are used. In the case of aromatic compounds having several vinyl groups, these percentages can however be exceeded. It is even possible to use these monomers exclusively for the production of the polymers.

Substances which can be used as non-solvents are for example aliphatic hydrocarbons such as benzine (b.p. 100° to 140°C.), white spirit (b.p. 160° to 196°C.), dodecane, aliphatic and cycloaliphatic alcohols, cyclohexanol, methanol, amyl alcohol, dodecanol, olein alcohol, aliphatic nitro compounds such as nitromethane, nitropropane, nitrohexane, and ethers such as diethylether, dibutylether, and diamylether. For producing the polymers, the monomers can be dissolved in the said non-solvents and thereafter polymerized in the presence of a free radical catalyst. For the production of bead-shaped polymers, the solutions of the monomers are suspended in aqueous medium and then polymerized. In this case, it is preferred to use non-solvents which have only slight solubility in water, such as for example n-decanol, olein alcohol, aliphatic hydrocarbons such as white spirit or those which are preferentially dissolved in the monomer mixture, such as for example n-amyl alcohol. The free radical catalysts are those which give off oxygen, such as for example benzoyl peroxide, cumene hydroperoxide, tertiary butyl peroxide, and other per-compounds, e.g. sodium persulfate and azocompounds such as azodiisobutyric acid dinitrile. It is also possible for this purpose to use Redox systems which in known manner consist of a combination of compounds giving off oxygen and compounds having reducing properties.

The polymerization is preferably carried out at temperatures from 30° to 150°C.

The halogenoalkylation and subsequent amination of the polymers takes place according to methods known per se such as those described for example in the above cited Patents. The copolymers may for instance be chloromethylated by treating them with formaldehyde and hydrochloric acid or with chloromethyl methyl ether and aluminum chloride. On the average about one chloro-methylene group is introduced for one to two aromatic nuclears of the copolymer. The amination of the halo-alkylated cross-lined copolymers is preferably carried through in the presence of swelling agents such as ethylene-dichloride at elevated temperatures such as 40° to 100°C.

It is known from U.S. Pat. No. 2,591,574 to use for the production of anion exchangers polymers which are obtained in the presence of small quantities of a solvent such as for example toluene, this solvent being used in quantities of about 5 percent. Solvents such as the toluene indicated by way of example are not able to produce polymers with a sponge structure, but only those having a gel structure, since substances such as toluene constitute solvents or swelling agents for polystyrenes. In addition, even when using non-solvents for polystyrene, such small additions as for example 5 percent are not sufficient to produce a sponge structure. Furthermore, it is already known to use so-called "bud" or "coliflower" or "proliferous polymers" for the production of porous anion exchangers. The formation of such bud polymers is effected only within very long time periods. Thus, induction times of 24 hours or more are necessary for producing genuine bud polymers. Moreover, when using bud polymers, it is only possible to produce anion exchangers of low volumetric capacity, since only small amounts of cross-linking agents, such as for example divinyl benzene, can be used for making the bud polymers; higher additions of for example divinyl benzene do not produce bud polymers, but mixtures of bud and gel polymers or true gel polymers.

EXAMPLE 1

1.6 g. of methyl cellulose were dissolved in 1,600 cc. of water and a mixture consisting of 450 g. of styrene, 55 g. of divinyl benzene, 45 g of ethylstyrene and 7 g. of moist 75 percent benzoyl peroxide as well as 300 g. of white spirit were added to the said solution while stirring. After dispersion, the mixture was heated to 75°C. and kept at this temperature for 4 hours while stirring. After adding another 100 g. of white spirit, the mixture was heated to 90°C. and stirred for another hour at this temperature. After cooling to 50°C. the bead polymer which had formed was filtered with suction and dried at 100°C. in a steam drying chamber. Yield: 490 g. of small opaque white balls.

Four-hundred g. of the dried polymer were swelled in 600 cc. of chloromethyl methyl ether and stirred for 6 hours at 50° to 55°C. after adding 300 cc. of ethylene chloride and 140 g. of zinc chloride. After the reaction liquid had been filtered with suction and the reaction product had been washed several times with ethylene chloride and water, the granular product had added thereto 400 cc. of water and 300 cc. of β-dimethyl aminoethanol and the mixture was heated for 5 hours at 50°C. while stirring. The liquid was then filtered with suction and the granular product washed several times with water and then with 15 percent hydrochloric acid. 1,420 cc. of slightly glossy milky white balls were obtained with an anion exchange capacity of 1.1 g. equivalent/liter of moist product.

EXAMPLE 2

Three hundred and fifty g. of a dried polymer prepared according to Example 1 but with addition of 400 g. of white spirit were chloro-methylated and aminated as indicated in Example 1.

Yield: 1440 cc. of white, dull, opaque balls with an anion exchange capacity of 0.92 equivalent/liter of moist product.

EXAMPLE 3

Three hundred g. of a dried polymer prepared according to Example 1 but with addition of 500 g. of white spirit were chloromethylated and aminated as in Example 1.

Yield: 1,640 cc. of dull, white opaque balls with an anion exchange capacity of 0.78 equivalent/liter of moist product.

The greater the addition of non-solvent which is chosen, the more porous, i.e. spongy, will be the structure. At the same time, the volume increases while the volume capacity decreases.

In spite of this decrease in the volume capacity, the absorption power for large acid molecules on the other hand increases. This is for example shown very clearly when decolorizing sugar solutions. Three hundred cc. per hour of a first discharge diluted to 10.5° Brix and having a coloring of 25° Stammer were filtered through each 100 cc. of the exchanger in the Cl form. The amount of filtrate which had been decolorized by at least 50 percent so that the coloring thereof was smaller then 12.5° Stammer was determined. Serving for comparison purposes was a non-porous anion exchanger which had been made according to Example 1 but without adding the white spirit.

The following values were obtained:

|  | Comparison | Exam. 1 | Exam. 2 | Exam. 3 |
|---|---|---|---|---|
| First filtrate decolorized to 50 % | 0 | 1.1 | 6.5 | 7.0 |

With increasing porosity, therefore, the color absorbing power, i.e., the capacity more especially with respect to acids of high molecular weight, increases in spite of decreasing total capacity.

Instead of employing tertiary amines for amination purpose it is also possible to use $NH_3$, and also primary and secondary amines, such as for example methyl amine and dimethyl amine, as well as polyamines, such as for example ethylene diamine, tetramethyl ethylene diamine, diethylene triamine, tetraethylene pentamine, etc.

EXAMPLE 4

0.6 g. of gelatine were dissolved in 1,200 cc. of water and a mixture consisting of 450 g. of vinyl toluene, 50 g. of ethylene glycol dimethacrylic acid ester, 3 g. of benzoyl peroxide and 300 g. of n-decaneol was added thereto while stirring. After dispersion for 1 hour, the mixture was heated to 65° to 70°C. and kept for 4 hours at this temperature while stirring. After this time, jelly-like balls had formed. With continued stirring, the mixture was heated to 90°C. and kept for another 2 hours at this temperature. The bead polymer which had formed was filtered with suction, washed several times with water and superficially dried. 500 g. of the bead polymer consisting of white non-transparent balls and containing decanediol were washed several times with ethylene chloride, the polymer swelling considerably. The polymer swelled in ethylene chloride was mixed with a solution of 250 g. of aluminum chloride in 600 cc. of chloromethyl methyl ether and kept for 3 hours at 50° to 55°C. while stirring. After filtering off the reaction liquid with suction and washing several times with ethylene chloride and tetrahydrofurane, the slightly yellowish reaction product in form of balls was heated with 500 cc. of 40 percent dimethyl amine solution and 1000 cc. of water for 4 hours at 50° to 55°C. After distilling off the tetrahydrofurane and washing with 10 percent hydrochloric acid, there were obtained 1,120 cc. of a slightly basic, slightly yellowish non-transparent anion exchanger with a capacity of 1.0 equivalent/liter of moist product.

The exchange speed of this slightly basic anion exchanger is about eight times as high as the exchanger prepared according to Example 4, but without n-decaneol being added.

If the addition of non-solvent is chosen to be very high, for example 200 to 300 percent of white spirit, anion exchangers are formed which have very high porosity, but low strength, which can easily be compressed to an imperceptible powder and which in this form are suitable both for medical purposes, for example removal of acidity from the stomach, and also for fine purification of liquids, for example by dry dispensation.

This application is related to U.S. Pat. No. 3,586,646.

We claim:

1. A method of treating liquid media to remove anions and coloring matter therefrom which comprises contacting said media with an anion exchanger produced by a process which comprises (a) dissolving a major amount of a monovinyl carbocyclic aromatic compound and a minor amount of a copolymerizable polyethylenically unsaturated monomer in an inert organic liquid which is a solvent for styrene but not for linear polystyrene, said inert organic liquid being selected from the group consisting of an inert aliphatic oxygen-containing solvent and an inert aliphatic hydrocarbon solvent and being present in an amount sufficient to impart a spongelike porosity to the copolymer formed therein, (b) incorporating said solution into an excess of water to form a dispersion of droplets and (c) copolymerizing said monovinyl carbocyclic aromatic compound and said polyethylenically unsaturated monomer while suspended in said aqueous medium and in the presence of said organic liquid and recovering the resulting copolymer in the form of opaque resin beads, and (d) then haloalkylating and aminating said copolymer beads.

2. A method of treating liquid media to remove anions and coloring matter therefrom which comprises contacting said media with an anion exchanger produced by a process which comprises (a) dissolving a major amount of styrene and a minor amount of divinyl benzene in an inert organic liquid which is a solvent for styrene but not for linear polystyrene, said inert organic liquid being selected from the group consisting of an inert aliphatic oxygen-containing solvent and an inert aliphatic hydrocarbon solvent, said solvent being present in an amount sufficient to impart a spongelike porosity to the copolymer formed therein; (b) incorporating said solution into an excess of water to form a dispersion of droplets; and (c) copolymerizing said styrene and said divinyl benzene while suspended in said aqueous medium and in the presence of said inert organic liquid, the resulting copolymer being recovered in the form of opaque resin beads, and (d) then haloalkylating and aminating the aforesaid resin beads.

3. A process in which an aqueous liquid containing both organic impurities and inorganic anions is treated with a particulate anion-exchange resin containing strongly basic groups, said resin having pores therein of a mean pore diameter of at least about 100 Angstrom units, said anion-exchange resin having been produced by copolymerizing a monomer having one polymerizable double bond, and at least 25 percent of a cross-linking agent having two polymerizable double bonds, in a solution in an organic liquid which is a solvent for the monomer mixture, but is not a solvent for the copolymer at room temperature, the solvent constituting from 30 to 80 percent of the total mixture.

4. A process as claimed in claim 3 in which said resin has at least 10 percent of its total pore volume in the form of pores greater than 350 Angstrom units in width.

5. A process as claimed in claim 3 in which the monomer is a monovinyl compound and the cross-linking agent is a divinyl compound.

6. A process as claimed in claim 3 in which the cross-linking agent is divinyl benzene.

7. A process as claimed in claim 6 in which the monomer is styrene.

8. A process as claimed in claim 3 in which the monomer is styrene.

* * * * *